L. S. Woodbury,
Fruit Parer.

No. 110,322.          Patented Dec. 20, 1870.

Witnesses.
S. N. Piper
J. R. Snow

L. S. Woodbury
by his attorney
R. H. Eddy

United States Patent Office.

LEANDER S. WOODBURY, OF SOUTH ANTRIM, NEW HAMPSHIRE, ASSIGNOR TO HIMSELF AND DAVID F. HUNT, OF SAME PLACE.

Letters Patent No. 110,322, dated December 20, 1870.

IMPROVEMENT IN FRUIT-PARERS.

The Schedule referred to in these Letters Patent and making part of the same.

*To all persons to whom these presents may come:*

Be it known that I, LEANDER S. WOODBURY, of South Antrim, of the county of Hillsborough, of the State of New Hampshire, have invented an Improved Fruit-Parer; and do hereby declare the same to be fully described in the following specification, and represented in the accompanying drawing making part thereof, of which—

Figure 1:
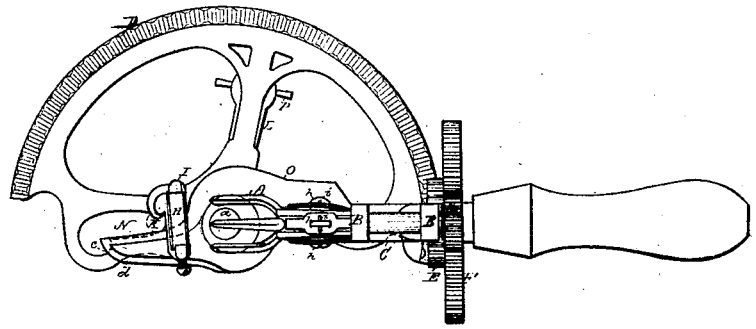

Figure 1 is a top view, and

Figure 2:
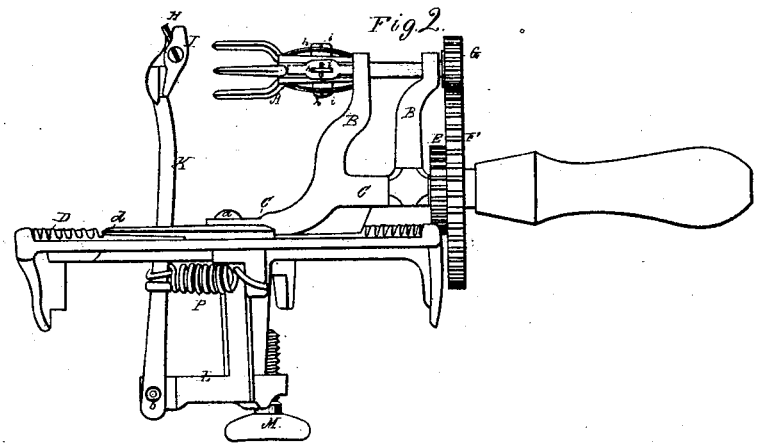

Figure 2, a rear elevation of it.

There are machines in common use in which the knife, preparatory to paring a fruit, is sprung toward it in a manner tending to force it off the prongs of its holder or fork and commence its operation of paring the fruit at that end of it next adjacent to the roots of the prongs of the fork, the pressure and action of the knife while cutting the rear half of the fruit tending to force the fruit off the fork.

The liability of the fruit being lowered on the fork-prongs, or ejected therefrom by the knife before commencing to pare, as well as while first paring a fruit, has proved an objection with many persons to such machines, particularly when used for paring peaches or other soft fruit.

In my improved machine the mechanism for operating the knife is so arranged and constructed as to obviate such difficulty incident to the other machines, and to cause the knife, while being sprung up to the fruit, to do so toward the "blow" or other end thereof, and then commence the paring of it, the pressure of the knife against the fruit, especially while paring the first half of it, tending to crowd the fruit endwise upon the prongs of the fork.

In figs. 1 and 2 of the drawing, the fork or rotary fruit-carrier is shown at A as fixed to an arbor, B. This arbor is supported by a lever, C, pivoted as shown at $a$, to a beveled tooth-sector, D. The said sector engages with a pinion, E, which is fixed to a spur-gear, F.

Both pinion and gear are applied to the lever, so as to revolve freely thereon, the gear F engaging with a pinion, G, fixed on the outer end of the fork-arbor.

The paring-knife is shown at H, its stock I being supported by a rod, K, which, at its lower end, is pivoted, as shown at $b$, to the clamp-frame L, of which the sectoral gear composes a part, or to which it is fixed, such frame being formed as represented, and provided with a clamp-screw, M, for aiding in fixing the machine to a table or bench.

The rod K extends through a slot, N, provided with a notch or recess, $c$, for catching the rod and holding the knife retracted. The back movement of the rod in the slot and into the notch is effected by a cam, O, arranged in the lever between its fulcrum and gears, and formed in manner as represented.

The knife-rod has a spring, P, applied to it and the frame, and arranged so as to draw the rod toward the fork, so as to crowd the fruit upon the fork, when the knife is sprung up to the fruit, preparatory to cutting or paring it.

The shorter arm $d$ of the lever serves to force the knife-rod out of the notch $c$ while the lever is being retracted.

It should be observed that the lever should be so loosely pivoted as to admit of being thrown into and out of the said notch, as well as of being moved through the slot N. The knife is so arranged in its stock that the cutting-edge of the said knife is downward, while in other machines, to which reference has hereinbefore been made, the cutting-edge of the knife has to be upward or at the top of the knife.

In the machines hereinbefore referred to as heretofore used, the shorter arm of the lever performs a very different function from what it does in my improved machine; that is to say, instead of serving as a means of discharging the knife-rod out of the recess or notch $c$, such shorter arm operates to force the rod into the notch, the rod being driven out of the notch by the longer arm of the lever.

When so driven out of the notch, the longer arm of the lever will be so moved by the spring as to throw the knife directly against the inner end of the front, and with a blow or pressure tending to force the fruit off the fork.

The arrangement of the cutting-edge of the knife and the knife-operative mechanism of my improved machine, therefore, it will be seen, differs from those of the other machines to which allusion has been made, and is productive of the useful results as stated, or, in other words, it overcomes the liability of the machine to expel the fruit from the fork, under circumstances as specified.

After a fruit may have been fixed on the fork, a forward movement is to be given to the lever, during which the fruit will be pared, and the knife-rod will be forced forward in the slot into the notch or recess $c$ thereof, where it will be held during the operation of removing the fruit from the fork and substituting another fruit in place of the pared one, such operation being carried on during part of the rearward movement of the lever. Finally, the said lever is to be pulled back, so as to cause its shorter arm to eject the knife-rod from the notch $c$, and thereby enable the knife-rod spring to force the knife up to the blow or outer end of the fruit, and in so doing crowd the fruit upon the fork.

In my improved machine I have exhibited each of the fork-prongs as a lever, provided with a bow-spring, and with such spring being fixed to the fork by a tenon, $h$, extending from the fork-shank through the lever and the spring, a pin, i, going through the tenon, as shown, serving to keep the prong and its spring in conjunction with the fork-shank. This method of making the fork I do not herein claim, and is not to be considered, as making part of my invention, as any proper fork may be used to hold the fruit to the arbor of the machine.

I make no claim to a fruit-parer so constructed that its knife, preparatory to paring a fruit, is forced or sprung against it in a manner tending to force it off the fruit-holder.

What I claim as my invention is—

The combination and arrangement, as shown in the drawing, and as hereinbefore described, of the following operative parts or instrumentalities, viz: The fork A, arbor B, lever C, beveled sector D, pinion E, spur-gear F, pinion G, paring-knife H, stock I, rod K, slot N, with its recess c, cam O, and spring P, the whole being applied together so as to operate in manner as explained.

LEANDER S. WOODBURY.

Witnesses:
R. H. EDDY,
J. R. SNOW.